Nov. 27, 1956 — E. JONES — 2,772,019

RUPTURE DISK ASSEMBLY

Filed March 15, 1950 — 2 Sheets-Sheet 1

INVENTOR.
Evan Jones,
BY Cromwell, Greist + Warden
Attys.

Nov. 27, 1956  E. JONES  2,772,019
RUPTURE DISK ASSEMBLY
Filed March 15, 1950  2 Sheets-Sheet 2
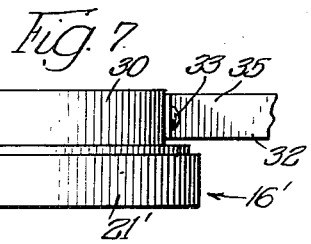
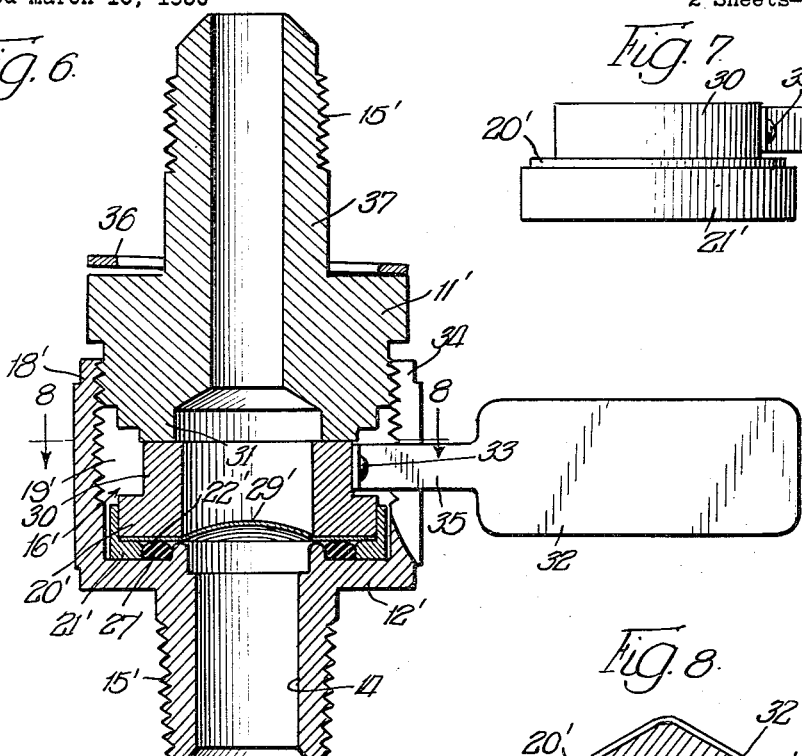
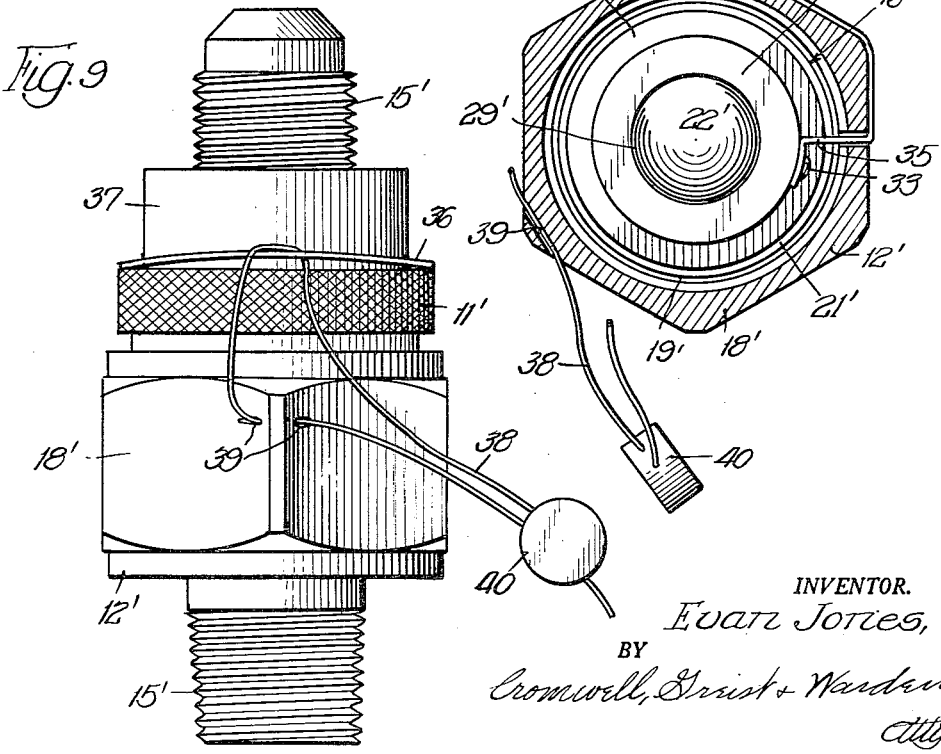
INVENTOR.
Evan Jones,
BY
Cromwell, Greist & Warden
Attys

United States Patent Office 2,772,019
Patented Nov. 27, 1956

2,772,019

RUPTURE DISK ASSEMBLY

Evan Jones, Evanston, Ill., assignor to Henry Valve Company, Incorporated, Melrose Park, Ill., a corporation of Illinois Application March 15, 1950, Serial No. 149,736

10 Claims. (Cl. 220—89)

The present invention relates to an improved rupture disk assembly for use in a pressure fluid handling system. More especially, the invention deals with an assembly of this type which includes a cartridge-type safety diaphragm unit of a novel sort associated with certain mounting members in an improved fashion enabling inexpensive replacement of the cartridge unit following rupture of its diaphragm.

In most existing types of rupture disk installation, characterized by a rupturable disk or element of thin frangible foil or like material, it is necessary to entirely dismantle the assembly in order to replace the ruptured disk. This entails the exercise of care in placing and clamping the new disk between the coacting mounting members so that there will be no leakage of the liquid under pressure which is sealed off by the disk or diaphragm. In some types of structure the operation of clamping the rupture disk is apt to unduly stress the relatively weak disk, by twisting or abrading the same, and thus induce early failure by tearing or bursting at a pressure less than the intended, critical rupture pressure. Uniformity of yielding pressure in different, theoretically identical installations, is difficult, if not impossible, to achieve.

Moreover, it is obvious that a manufacturer of a known type of rupture device must be prepared to furnish them for initial installation in a wide range of bursting pressures, depending on the type of fluid handling system involved. This means that many sizes must be stocked, some for relatively infrequent sale, which differ with respect to one another primarily only in the rupture strength of their frangible element. It is particularly desirable to reduce needless multiplication of designs needed to service varying requirements, and in doing so to insure uniformity of performance of all rupture devices of a like theoretical rupture pressure rating. These ends can be attained by providing a cartridge type rupture unit which, in so far as its external dimensions are concerned, is interchangeable with other units of different rating, and which can be assembled in a moment's time in a standard mounting structure adapted to receive any of a plurality of different ratings of rupture cartridges. Being preassembled at the factory, the possibility of damaging the delicate rupture disk of the unit during replacement in the field is eliminated.

It is therefore a general object of the invention to provide a simple and inexpensive, cartridge type rupture disk assembly which is extremely compact in size and is easily and quickly assembled in a fluid handling system, as well as being equally readily resupplied with a new cartridge disk unit following bursting under abnormal heat or pressure conditions.

It is another general object of the invention to provide a self-contained, safety device unit of the foregoing character including a pair of connector fittings adapted for ready and quick assembly of the unit in the protected line or system, and a thin, readily rupturable safety disk of an appropriate thin metallic foil or equivalent material, in which said disk is preassembled as a permanent cartridge, under factory conditions, with certain clamping and sealing elements, so as to insure proper, non-destructive and uniform mounting of the disk, said cartridge being subsequently assembled to said fittings.

It is a further object of the invention to provide, as a new article of manufacture, a cartridge type rupture disk unit for a safety device of the kind referred to in the preceding paragraph, including a frangible disk and annular sealing and clamping elements coacting therewith in an improved manner.

A still further object is to provide a rupture disk cartridge of the foregoing sort in which a rupture disk is clamped in an improved non-twisted, non-wedged and non-abraded manner between a compressible O-ring carried by a grooved fitting at one side of the disk and a coacting clamping fitting which engages the other side of the unit.

Yet another specific object of the invention is to provide a rupture structure of the sort referred to above in which said clamping fittings engage the rupture disk externally of the compressible O-ring sealing element, remote from the effective bursting area of the disk, with a positive metal-to-metal clamping engagement, and in which said disk is engaged with said O-ring to produce a very effective compressed, liquid-tight seal adjoining the bursting area.

Still another object is to provide a rupture disk assembly including an improved rupture disk cartridge or unit housed between a pair of coacting, threadedly connected fittings, in which said cartridge carries an identification and/or rating tag setting forth the properties or rating of the rupture disk thereof, which tag is visible from the exterior of the assembly thereby facilitating servicing of the latter, insertion of a proper replacement cartridge upon rupture of the existing unit.

Yet another object is to provide, as an article of manufacture, a rupture disk cartridge characterized by a thin, readily frangible rupture disk permanently and positively clamped between a pair of annular members, together with a pair of rating tags flexibly applied to said cartridge.

A further object is to provide an assembly of the type referred to in the preceding paragraphs having provision for preventing unauthorized access to the rupture cartridge thereof.

The foregoing statements are indicative in a general way of the nature of the invention, but other and more specific objects will be apparent to those skilled in the art upon a full understanding of the construction and operation of the device.

Two embodiments of the invention are presented herein for purpose of illustration, but it will be appreciated that the invention is susceptible of incorporation in other modified forms coming equally within the scope of the appended claims.

In the drawings,

Fig. 6 is a view in longitudinal, axial section through a cartridge type rupture disk unit in accordance with a modified adaptation of the invention;

Fig. 7 is a view in side elevation of the special modified rupture disk cartridge employed in the embodiment of Fig. 6;

Fig. 8 is a view in horizontal section along a line 8—8 of Fig. 6; and

Fig. 9 is a view in external side elevtion of the rupture disk assembly of Fig. 6, illustrating certain provisions for preventing unauthorized access to the interior thereof.

Figure 1:
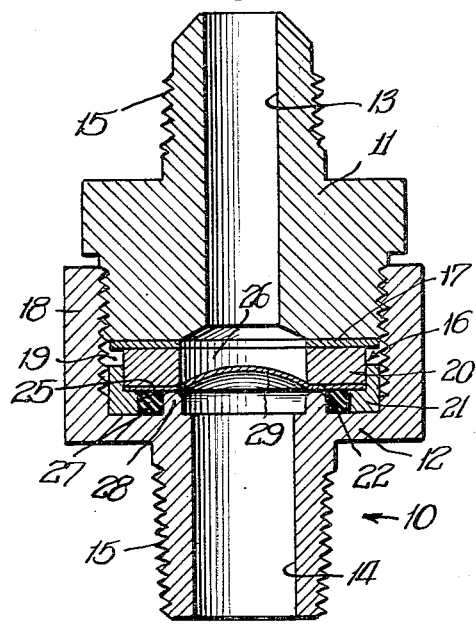
Figs. 1 and 2 are, respectively, views of one embodiment of the improved rupture disk assembly in axial section and in side elevation.
Figure 2:
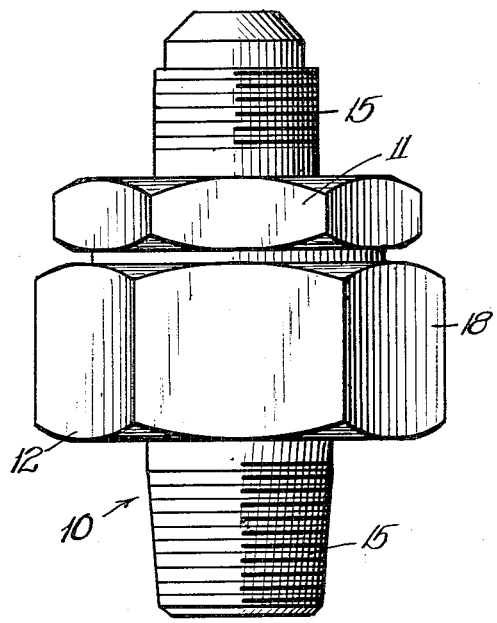
Figure 3:
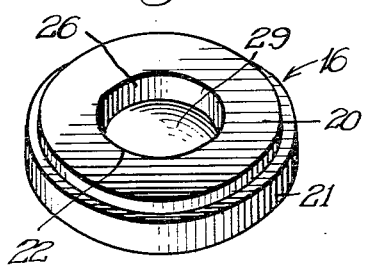
Fig. 3 is a perspective view of the replaceable cartridge-type rupture unit of the assembly.

Referring to the drawings, the reference numeral 10 generally designates the rupture disk assembly of the present invention. It comprises a pair of threadedly engaged coupling nipples or fittings 11, 12 provided with the axially extending passages 13, 14 respectively and externally threaded at 15 for connecting the assembly to a fluid handling system. The other main component of the assembly is the cartridge-type rupture disk unit, generally designated 16, which is clamped up between the fittings 11, 12, with a compressible gasket 17 interposed between fitting 11 and unit 16. The fitting 12 is provided with an axially extending annular wall 18 which is hexagonal in external shape and is internally shaped to provide a circular chamber 19 adapted to receive the unit 16. Wall 18 is internally threaded to engage fitting 11 and there is sufficient clearance between the wall 18 and the unit 16 to enable the latter to be readily slipped in place.

The rupture disk unit 16 is fabricated of three parts assembled in fixed relation to one another. These are the telescoped clamping rings 20, 21 and the rupture disk per se, designated 22. Rings 20, 21 are preferably of brass and are rounded slightly at the respective adjacent edges of their inner periphery, as indicated at 23. Ring 21 has an enlarged counterbore portion 24 in which the ring 20 is received with a press fit to clamp the disk 22 therebetween. The axial opening 25 of ring 21 is of substantially greater diameter than that of ring 20, designated 26. In assembled relation the outer marginal zone of the disk 22 is tightly clamped in a metal-to-metal engagement by rings 20, 21 so that displacement of the disk as a whole under pressure is not possible. The force-fitted relationship of the rings enables the same to be brought into rigid, metal to metal clamping engagement with disk 22 without damaging the latter, whereas a rotative, screw threaded connection of the rings to one another would cause the disk to be subjected to twisting, tearing stress when being compressed between the rings. A similar consideration is involved in the mounting of the unit 16 as a whole between the fittings which clamp the same in place. The diaphragm is not subjected to any force derived from relative movement tending to impose a tearing or displacing stress thereon.

The enlarged internal diameter 25 of ring 21 affords a space at which the lower surface of disk 22 is sealingly engaged by a resilient compressible gasket or O-ring 27 of a yieldingly compressible material such as rubber or synthetic rubber, see Fig. 1. This O-ring rests on the floor of chamber 19 of fitting 12. It is properly located in concentricity with the axial passage 14 of that fitting, in order to facilitate subsequent dropping of disk unit 16 into proper place, by the integral, upstanding annular ledge 28 surrounding the passage and projecting into the chamber. Ledge 28 is insufficient in axial dimension to engage the disk 22 under force, in fact it is preferably retracted sufficiently to normally avoid direct engagement with the disk. It serves to restrict possible flutter of the disk adjacent its central bursting area and is rounded at its upper portion to avoid a knife edge action at that zone. This is also the purpose of rounding rings 20, 21 at 23. The disk 22 of unit 16 is advantageously made of an appropriate pressure rupturable and, if desired, heat fusible metal foil in a uniform, relatively thin cross section of, say .001" to .003" thickness. The particular metal foil to be employed and the thickness thereof are of course determined by the requirements of the particular installation in question, with regard to the pressure the unit is to contain, the corrosiveness or non-corrosiveness of the fluid and, in some cases, the maximum permissible temperature.

Disk 22 includes a central, axially convex portion 29 of circular shape which is adapted to extend into the axial passage 26 of the upper ring 20 of unit 16 when the parts are clamped together in force-fit relation. In this relation the disk is well protected by the rings against accidental breakage due to impact. The positive, metal-to-metal clamp exerted on the disk 22 externally of the gasket or O-ring 27 is not particularly dependent on the force applied in installing the assembly in the field, which obviously is a highly variable matter, but is produced during force-fitting of the rings 20, 21 together in the factory. The O-ring is predeterminedly, uniformly and controlledly compressed, the extent of compression being limited by the ring 21 as shown in Fig. 1. Such compression causes the O-ring to expand laterally and considerably fill the space between ledge 28 and ring 21, thereby producing a very reliable, fluid-tight seal.

The feature of an individual, cartridge rupture unit 16 insures performance of the intended pressure sealing functions with uniform efficiency and at identical rupture disk pressures, for a given rating, in each and every one of thousands of installations. Yet no particular care is required in installing the assembly or replacing the disk. The fittings 10, 11 may be produced in standard dimensions and the units 16 in any desired rating, by a simple selection of the thickness or material of disk 22. A change in the rating of the cartridge unit thus changes the rating of the assembly as a whole, using the same standard-size parts.

Figure 4:
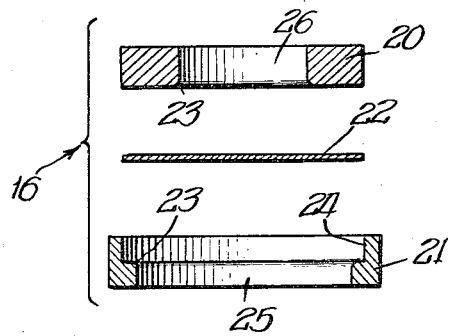
Fig. 4 is an exploded view of the rupture unit, showing the component parts of the same in axial section.
Figure 5:
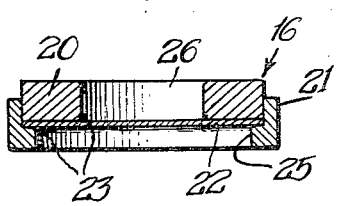
Fig. 5 is an axial section of the rupture disk cartridge in the assembled condition of its parts.

As pointed out above, the rupture disk 22 in its finally assembled position in the cartridge or rupture disk unit 15 is axially convex in shape at its central portion. However, as initially installed in the unit this disk is flat (see Figs. 4 and 5), the convex bulge 29 thereof resulting from pressure which is applied to the assembly during testing prior to sale.

A modified and further refined embodiment of the invention is illustrated in Fig. 6. Its parts generally resemble the components of the above described form hence, to the extent that they correspond generally in structure and function, will be designated by corresponding reference numerals, primed; further description is unnecessary and will be dispensed with.

In this adaptation of the invention the ring 20' of the cartridge unit 16' has an axial upper wall extension 30, and the annular wall 18' of the fitting 12' is further extended in the axial direction in order to accommodate the increased dimension of the ring. The upper fitting 11' has an annular lower rim 31 which bears against the extension 30 to hold the cartridge 16' in place.

In order to visibly indicate the pressure rating or other characteristic of the disk cartridge 16', thereby greatly facilitating servicing by replacement, a special rating and/or identification tag 32 is applied to the upper ring extension 30 by means of a rivet 33. The wall 18' is axially slotted at 34 to receive the narrow, flexible band extension 35 of tag 32, by which the same is attached to ring 21'. When the cartridge is in place the tag 32 is bent circumferentially about the exterior of the fitting 12, as illustrated in Fig. 8.

It is also desirable to provide means preventing unauthorized access to or dismantling of the assembly once the proper cartridge is in position therein. To this end, I provide a lock ring 36 which slips over the neck 37 of fitting 11'. A wire 38 is passed between said neck and the ring 36, as illustrated in Fig. 9, and likewise through a hole 39 drilled through an angle of the hexagonal body of fitting 12'. A lead seal 40 applied to the free ends of the wire 38 insures against undetected separation of the fittings 11', 12'.

I claim:

1. In a rupture disk assembly characterized by a pair of coacting annular mounting members, a compressible sealing ring and a separate, cartridge-type rupture disk unit disposed between said members in fluid sealing relation thereto, said unit comprising a frangible disk and a pair of concentric annular clamping elements in clamping relation to said disk adjacent the margin thereof, said sealing ring having axial sealing engagement with said disk internally of the clamped margin of the latter, said disk clamping elements having axially telescoped and rigid, displacement-resistant securing engagement with one another independently of said mounting members.

2. A rupture disk assembly in accordance with claim 1 in which a flexible identification tag is secured to said rupture disk unit, and in which a portion of one of said mounting members peripherally surrounds said unit and is apertured to receive and expose said tab externally of the assembly.

3. In a rupture disk assembly characterized by a pair of coacting annular mounting members, one of which is provided with an axially extending annular ledge surrounding the bore thereof, a compressible sealing ring centered by said ledge, and a separate, cartridge-type rupture disk unit disposed between said members in fluid sealing relation thereto, said unit comprising a frangible disk and a pair of clamping elements having direct clamping engagement with said disk adjacent the margin thereof, said sealing ring having axial sealing engagement with said disk internally of the clamped margin of the latter, said disk clamping elements having permanent, displacement-resisting engagement with one another independently of said mounting members.

4. A rupture disk assembly comprising a pair of coacting annular mounting members, a compressible sealing ring and a separate, cartridge-type rupture disk unit disposed between said members in fluid sealing relation thereto, said unit comprising a frangible disk and a pair of rigid, concentric annular clamping elements in direct positive clamping engagement with said disk adjacent the margin thereof, said sealing ring being compressed by said mounting members into sealing engagement with said disk internally of the clamped margin of the latter, said disk clamping elements having displacement resisting, engagement with one another independently of said mounting members, one of said mounting members having an annular, axially projecting ledge concentric with one of said clamping elements and coacting therewith in defining a groove in which said sealing ring is disposed.

5. A rupture disk assembly comprising a pair of coacting annular mounting members, one of which is provided with an axially extending annular ledge surrounding the bore thereof, a compressible sealing ring external of and centered by said ledge, and a separate, cartridge-type rupture disk unit disposed between said members in fluid sealing relation thereto, said unit comprising a frangible disk and a pair of rigid clamping elements having direct, positive clamping engagement with said disk adjacent the margin thereof, said sealing ring being compressed in sealing engagement with said disk internally of the clamped margin of the latter and externally of said ledge, one of said clamping elements having a portion concentric with said ledge and coacting therewith in defining a groove in which said ring is disposed, said ledge being out of clamping engagement with said disk.

6. A rupture disk assembly comprising a pair of coacting annular mounting members, one of which is provided with an axially extending annular ledge surrounding the bore thereof, a compressible sealing ring external of and centered by said ledge, and a separate, cartridge-type rupture disk unit disposed between said members in fluid sealing relation thereto, said unit comprising a frangible disk and a pair of rigid clamping elements having direct, positive clamping engagement with said disk adjacent the margin thereof, said sealing ring being compressed in sealing engagement with said disk internally of the clamped margin of the latter and externally of the ledge, one of said clamping elements having a portion concentric with said ledge and coacting therewith in defining a groove in which said ring is disposed, said ledge being out of clamping engagement with said disk, said disk clamping elements having permanent, displacement-resisting engagement with one another independently of said mounting members.

7. As an article of manufacture, a rupture disk assembly comprising a pair of threadedly engaged tubular fittings, a rupture disk cartridge clamped between said fittings, said cartridge being provided with an identification tag projecting therefrom and one of said fittings being apertured to receive and expose said tag externally of the assembly.

8. As an article of manufacture, a rupture disk assembly comprising a pair of threadedly engaged tubular fittings, a rupture disk cartridge clamped between said fittings, said cartridge comprising a disk clamped between a pair of force-fitted rings, said cartridge being provided with an identification tag projecting therefrom and one of said fittings being apertured to receive and expose said tag externally of the assembly.

9. A rupture disk unit comprising a pair of threadedly engaged tubular fittings, a rupture disk cartridge clamped between said fittings, said cartridge being provided with an identification tag projecting therefrom and one of said fittings being apertured to receive and expose said tag externally of the assembly, and sealing means applied externally to said fittings to restrain separation thereof.

10. In combination, a cartridge-type rupture disk unit and a yieldingly compressible annular gasket, said unit comprising a thin rupture disk, and a pair of rigid, open-ended rings of limited axial dimension which are fixedly force-fitted together in axially telescoped relation, one of said rings having a radially inwardly extending flange clamping said disk in rigid engagement with the other ring, the internal diameter of said flange member being substantially greater than that of said other ring and the internal periphery of said flange engaging and centering said gasket on one side of said disk and inwardly of the disk clamping zone, an annular, axially facing zone on said other ring being of greater radial width than the radial thickness of the gasket and projecting radially inwardly of said flange in sealing engagement with the gasket outwardly of the internal periphery of said other ring.

References Cited in the file of this patent

UNITED STATES PATENTS

| | | |
|---|---|---|
| 533,806 | Hesketh | Feb. 5, 1895 |
| 589,944 | Greengrass | Sept. 14, 1897 |
| 1,703,624 | Huff | Feb. 26, 1929 |
| 2,178,178 | McKeever | Oct. 31, 1939 |
| 2,183,208 | Allen | Dec. 12, 1939 |
| 2,194,159 | Bonyun | Mar. 19, 1940 |
| 2,437,836 | Santiago | Mar. 16, 1948 |
| 2,533,547 | Anderson | Dec. 12, 1950 |

FOREIGN PATENTS

| | | |
|---|---|---|
| 257,078 | Great Britain | Aug. 26, 1926 |